US008660622B2

(12) United States Patent
Holman, IV et al.

(10) Patent No.: US 8,660,622 B2
(45) Date of Patent: Feb. 25, 2014

(54) ROLLER ASSEMBLY FOR A MOBILE COMMUNICATION DEVICE

(75) Inventors: Martin Earl Holman, IV, West Palm Beach, FL (US); Aaron Robert Allen, Pembroke Pines, FL (US); Douglas Wayne Moskowitz, Weston, FL (US); Felipe Alonso Varela, Sunrise, FL (US)

(73) Assignee: BlackBerry Limited, Waterloo (CA)

( * ) Notice: Subject to any disclaimer, the term of this patent is extended or adjusted under 35 U.S.C. 154(b) by 380 days.

(21) Appl. No.: 12/721,071

(22) Filed: Mar. 10, 2010

(65) Prior Publication Data
US 2010/0234080 A1 Sep. 16, 2010

Related U.S. Application Data (60) Provisional application No. 61/158,833, filed on Mar. 10, 2009.

(51) Int. Cl.
*H04M 1/00* (2006.01)
(52) U.S. Cl.
USPC .............. 455/575.4; 455/575.1; 455/550.1
(58) Field of Classification Search
USPC ................. 455/575.4, 575.1, 550.1
See application file for complete search history.

(56) References Cited

U.S. PATENT DOCUMENTS

| 7,209,772 B2* | 4/2007 | Crisp ................... 455/575.4 |
| 7,400,913 B2 | 7/2008 | Richter et al. |
| 7,774,033 B2* | 8/2010 | Lee ...................... 455/575.4 |
| 2005/0250563 A1 | 11/2005 | Nan |

FOREIGN PATENT DOCUMENTS

| EP | 1830542 A2 | 9/2007 |
| WO | WO-2006006776 | 1/2006 |
| WO | 2007136224 A1 | 11/2007 |

OTHER PUBLICATIONS

Extended European Search Report for EP Patent App. No. 10156038.1, Jul. 7, 2010.
Diabell Up&Down Slide; Diabell Co., Ltd; http://diabell.com/En/Products/Slide.asp; retrieved on Jan. 15, 2008.
Office Action mailed Dec. 4, 2012, in corresponding Canadian patent application No. 2,696,350.

* cited by examiner

*Primary Examiner* — Nghi H Ly
(74) *Attorney, Agent, or Firm* — Novak Druce Connolly Bove + Quigg LLP (57) ABSTRACT

The disclosure is directed at a roller assembly for a mobile communication device having a top portion and a bottom portion, the top and bottom portions slidably connected, the roller assembly comprising a slide plate; a guide plate including guide rails for receiving the slide plate; an actuator connected to the slide plate and the guide plate; a shuttle portion, located within the slide plate; and a cam portion for engaging with the shuttle portion, the cam portion including an intermediate detent portion; whereby when the slide plate is moved between open and closed potions, the slide plate can be stopped in an intermediate position by the intermediate detent portion.

19 Claims, 14 Drawing Sheets

ROLLER ASSEMBLY FOR A MOBILE COMMUNICATION DEVICE

CROSS-REFERENCE TO RELATED APPLICATIONS

This application claims the benefit of U.S. Provisional Application No. 61/158,833 filed Mar. 10, 2009, which is incorporated herein by reference.

FIELD OF THE DISCLOSURE

The present disclosure relates generally to mobile communication devices. More particularly, the present disclosure relates to a roller assembly for a slider-type mobile communication device.

BACKGROUND OF THE DISCLOSURE

The market for mobile communication devices is ever increasing and mobile communication devices with different features are continuously being introduced. Along with new functionality, different types of mobile communication devices are also being manufactured. One type of mobile communication device is a slider phone.

A slider, or slider phone, typically includes two portions, whereby one of the two portions slides with respect to the other portion between open and closed positions. In the closed position, the user is typically unable to access any of the phone functionality (or can only access limited phone functionality) and in the open position, the user is able to access all phone functionality. The sliding movement is generally enabled via an assembly located within the phone connecting the two portions together. Many current assemblies suffer from various disadvantages such as the two portions only being able to move between two positions, namely open and closed; susceptibility to water intrusion as there are plenty of openings and cutouts within the assembly; or lack of unidirectional movement for multi-position phones.

BRIEF DESCRIPTION OF THE DRAWINGS

Embodiments of the present assembly will now be described, by way of example only, with reference to the attached Figures, wherein.

DETAILED DESCRIPTION

In one aspect of the disclosure, there is provided a roller assembly for a mobile communication device having a top portion and a bottom portion, the top and bottom portions slidably connected by the roller assembly, the roller assembly comprising a slide plate; a shuttle portion located within the slide plate; and a cam portion for engaging with the shuttle portion, the cam portion including an intermediate detent portion; whereby when the slide plate is moved between open and closed positions, the slide plate can be stopped in an intermediate position by the intermediate detent portion.

In another aspect, there is provided a roller assembly for a mobile communication device having a top portion and a bottom portion, the top and bottom portions slidably connected by the roller assembly, the roller assembly comprising a slide plate mounted to the top portion; a shuttle portion located within the slide plate; and a cam portion for engaging with the shuttle portion in open, intermediate and closed positions; wherein a slide force experienced by the slide plate in a slide direction between the open, intermediate and closed positions parallels a magnetic slide assembly slide force profile.

Generally, a roller assembly for a mobile communication device of the slider type is provided.

Figure 1A:
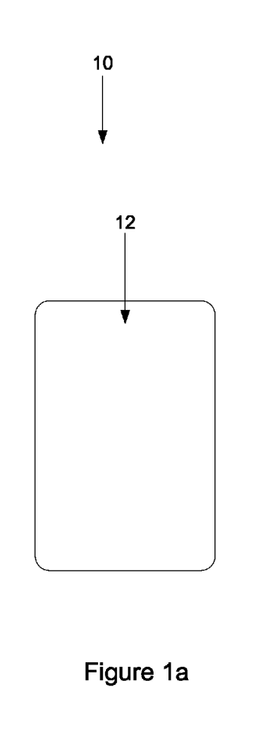
FIG. 1a is a front view of a mobile communication device in a closed position.
Figure 1B:
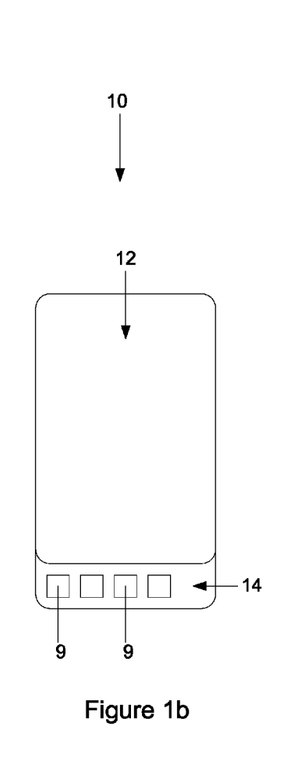
FIG. 1b is a front view of the mobile communication device in an intermediate position.
Figure 1C:
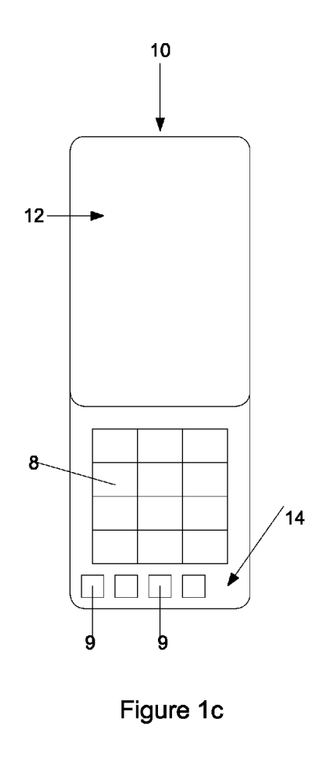
FIG. 1c is a front view of the mobile communication device in an open position.

Turning to FIGS. 1a to 1c, front views of a mobile communication device of the slider type in different positions are shown. The communication device 10 includes a top portion 12 and a bottom portion 14 which slide with respect to each other between closed (FIG. 1a), intermediate (FIG. 1b) and open positions (FIG. 1c). The movement is enabled by a roller assembly which will be described in more detail below.

In the closed position, typically none of the device functionality can be accessed by the user; however, depending on the type of slider phone, a clock may be visible on a display screen (not shown). It is also contemplated that other identifiers can be visible on the display screen, such as a number of email messages, a user-selected photo, or a meeting reminder (not shown), although it is appreciated that the present disclosure is not limited to the identifiers described herein. In devices having an external touch screen display or a navigational input device on the top portion 12, limited device functionality may be available in the closed position. In the intermediate position, predetermined functionality can be accessed by the user such as via buttons 9. For instance, music player or camera functionality can be enabled or actuated by the buttons 9, although it is appreciated that additional functionality (i.e., navigation and browsing functionality) can be accessed by actuating the buttons, as known in the art. In the open position, further device functionality can be accessed such as phone functionality via a keypad 8 or email functionality via a keyboard. It is contemplated that the keypad 8 can be an alphanumeric telephone keypad, a full QWERTY keypad, an AZERTY keypad or a reduced QWERTY keypad, as known in the art, although the device 10 is not limited to these types of keypads. The device 10 can also include a navigational input such as a trackball, optical trackpad, joystick, or thumbwheel (not shown), although it is appreciated that alternative navigational inputs may also be appropriate.

Figure 2:
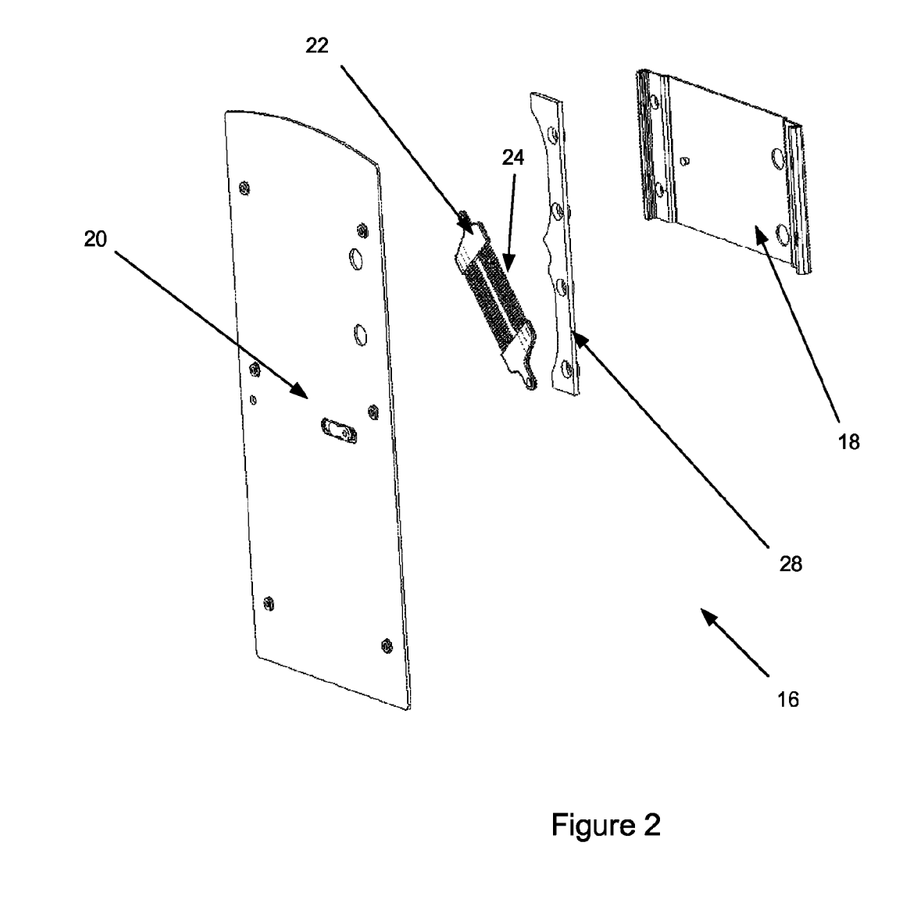
FIG. 2 is an exploded view of a roller assembly for use with the mobile communication device.

Turning to FIG. 2, an exploded view of a roller assembly 16 for use with the communication device 10 is shown. The roller assembly 16 provides the mechanism for the top portion 12 to slide with respect to the bottom portion 14. The roller assembly 16 includes a guide plate 18 (which is mounted internally to the bottom portion 14 of the device 10), a slide plate 20, an actuator 22 preferably including a set of springs 24, a shuttle portion 26 and a cam portion 28.

Figure 3:
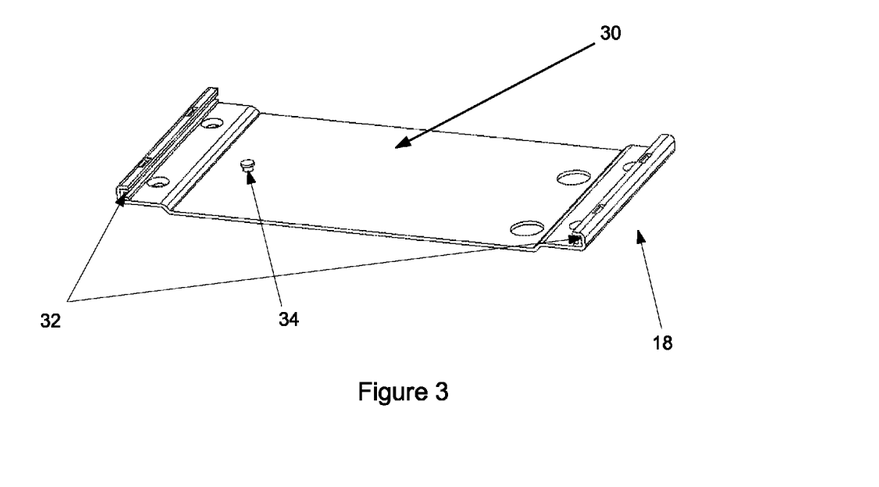
FIG. 3 is a perspective view of a guide plate of the present roller assembly.

The guide plate 18, as shown in FIG. 3, includes a base portion 30 and a pair of guide rails 32. The base portion 30 is generally planar and shaped to conform with an upper front face (not shown) of the bottom portion 14. In one embodiment, the guide rails 32 are manufactured of a material with low friction properties. The guide rails 32 are integrally formed with the guide plate 18, although it is appreciated that the guide rails could be separately formed and secured to the guide plate 18 by welding or the like. The guide rails 32 are arranged on opposing ends of the guide plate 18, and are substantially parallel to each other. Within the base portion 30 is a hole 34 for receiving an actuator mounting pin 36, which will be described in further detail below. The guide plate 18 is mounted to the bottom portion 14 so that it is stationary at all times within the device. Specifically, although other locations may be possible, the guide plate 18 is fixedly mounted near the upper front face of the bottom portion 14, and is configured to receive the slide plate 20 via the guide rails 32, which will be described in further detail below. The guide plate 18 is hidden from view during sliding of the device 10 between the closed, intermediate and open positions.

Figure 4:
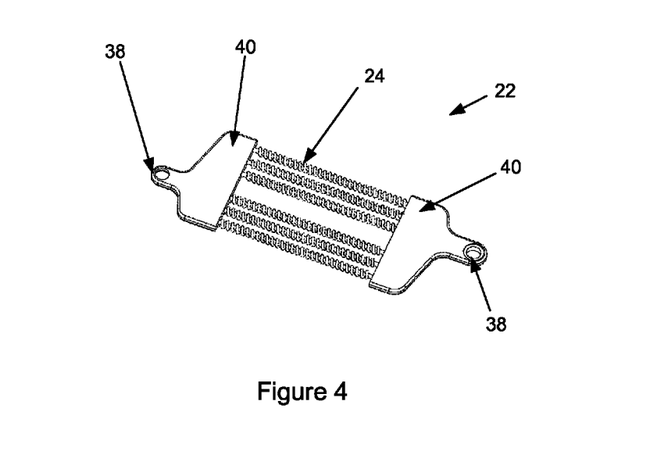
FIG. 4 is a perspective view of an actuator of the roller assembly.
Figure 8A:
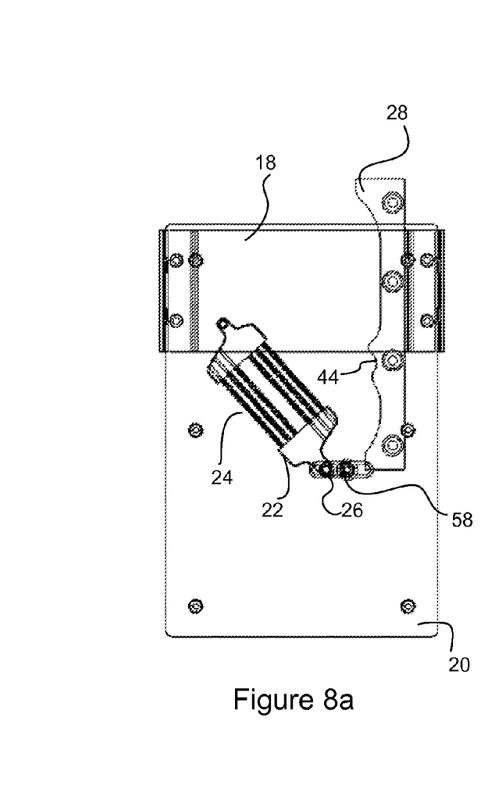
FIGS. 8a to 8c are front views of the roller assembly in closed, intermediate and open positions.
Figure 8B:
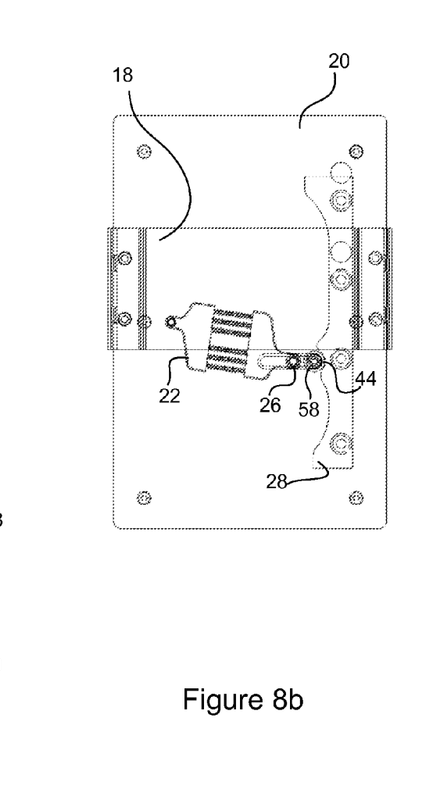
Figure 8C:
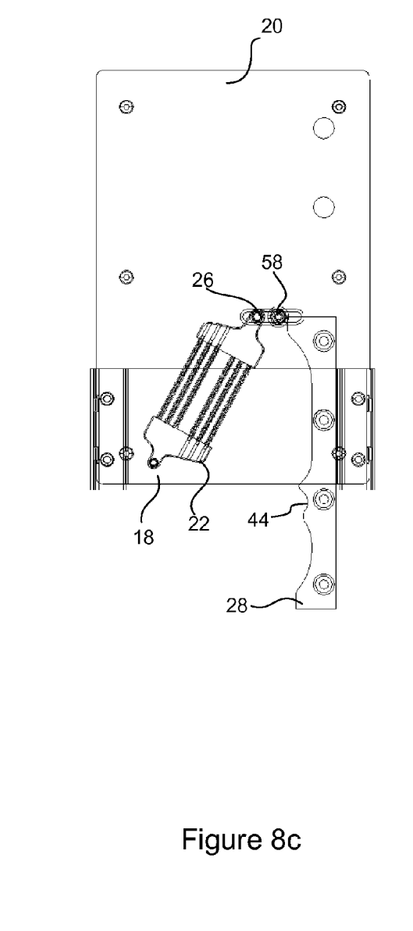

FIG. 4 is a perspective view of the actuator 22. The actuator 22 includes a set of openings 38 located within end pieces 40. The openings 38 are located on opposing end pieces 40 of the actuator 22, and are offset from one another, although alternative arrangements may be suitable. One of the openings 38 allows for the mounting of the actuator 22 to the guide plate 18 via the actuator mounting pin 36, and the other of the openings 38 allows for mounting of the actuator to the slide plate 20 via the shuttle portion 26 (FIGS. 8a-8c). The set of springs 24 is attached to both of the end pieces 40 and reacts in accordance with the force being applied to the top portion 12, which will be described in further detail below.

Figure 5:
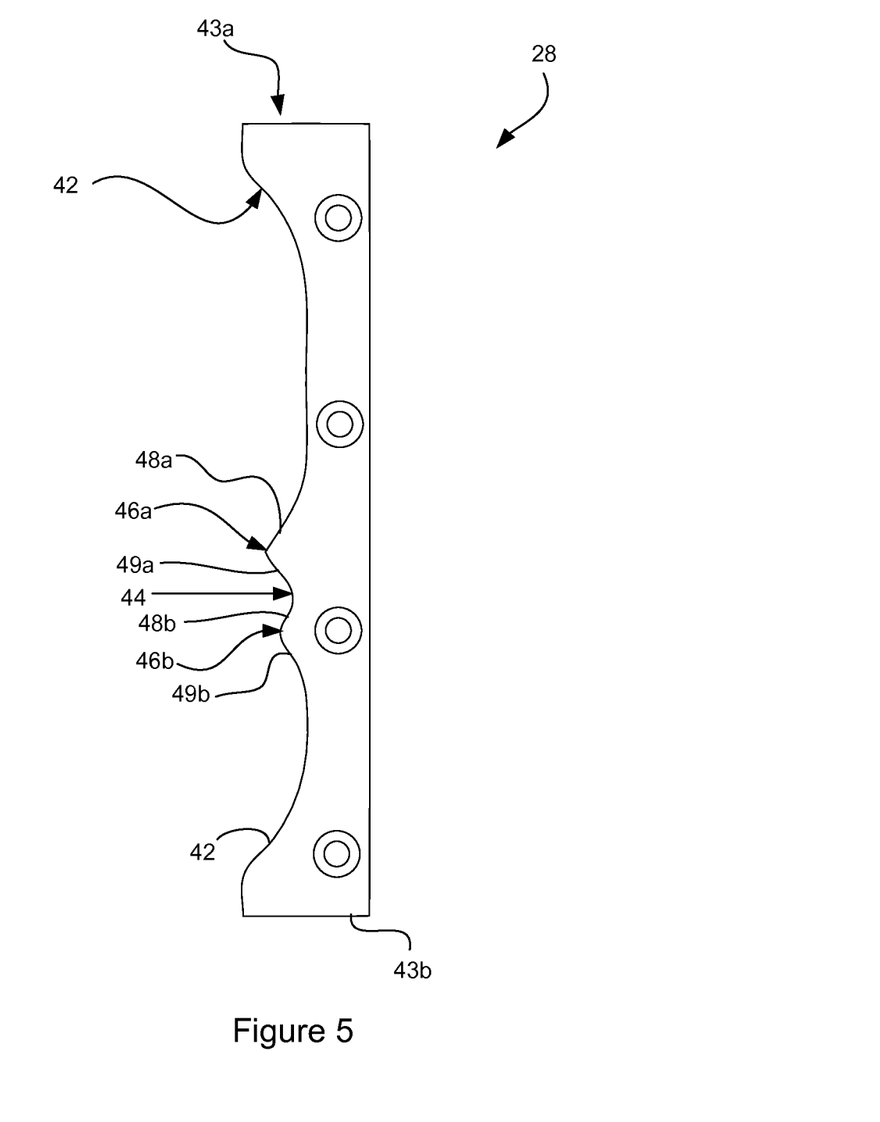
FIG. 5 is a front view of a cam portion of the roller assembly.

FIG. 5 is a front view of the cam portion 28. The cam portion 28 is mounted to the upper front face (not shown) of the bottom portion 14 and includes a pair of velocity reducing sections 42 which are located at opposite ends of the cam portion 28. In the current drawing, for explanation purposes, top end 43a represents the open position and bottom end 43b represents the closed position. The velocity reducing sections 42 provide a dampening stop to reduce the impact that a user will experience as they are moving towards the open and closed positions. In current slider phones, when the top 12 and bottom 14 portions of the slider-type phone are urged between the open and closed positions, when either position is reached, a jolt or impact is experienced by the user.

Located between the two velocity reducing sections 42 is an intermediate stopping detent 44, seen as a pair of ridges 46a and 46b, which represents the intermediate position (as shown in FIG. 1b). The ridges 46a and 46b provide direction dependent detent features. More specifically, edges 48a and 48b of ridges 46a and 46b that are closer or proximal to the top end 43a include a subtle or gentle slope so that when the slide plate 20 is urged from the open position to the closed position, the user is not required to stop at the intermediate position and can experience uninterrupted travel from the open to the closed position. However, it should be noted that the slope of edge 48b is such that it is capable of stopping the shuttle portion 26 (or slide plate 20) during its travel from the open position to the closed position if an adequate force to overcome the edge 48b is not applied by the user. In other words, if adequate force is not supplied to overcome the edge 48b, the shuttle portion 26 will rest in the stopping detent 44 (i.e., the intermediate position shown in FIG. 1b), and will not travel uninterrupted between the open and closed positions.

A bottom edge 49b of ridge 46b, which is located proximal to the bottom end 43b of the cam portion 28, has a gentle slope in comparison to the slope of a bottom edge 49a of ridge 46a. Specifically, the edge 49a has a steeper profile than that of edge 49b in order to provide a stopping feature so that when the top portion 12 is being urged from the closed position to the open position, the top portion 12 rests in the stopping detent 44 (i.e., in the intermediate position) before continuing to the open position. In other words, unlike the potential uninterrupted travel from the open to the closed position described above, the action of opening the device includes the top portion 12 resting in the stopping detent 44, in the intermediate position. However, as the user continues to urge the top portion 12 to the open position, the top portion moves out of the stopping detent 44 and into the fully open position. In this embodiment, uni-directional travel between the closed, intermediate and open positions is achieved.

Figure 6A:
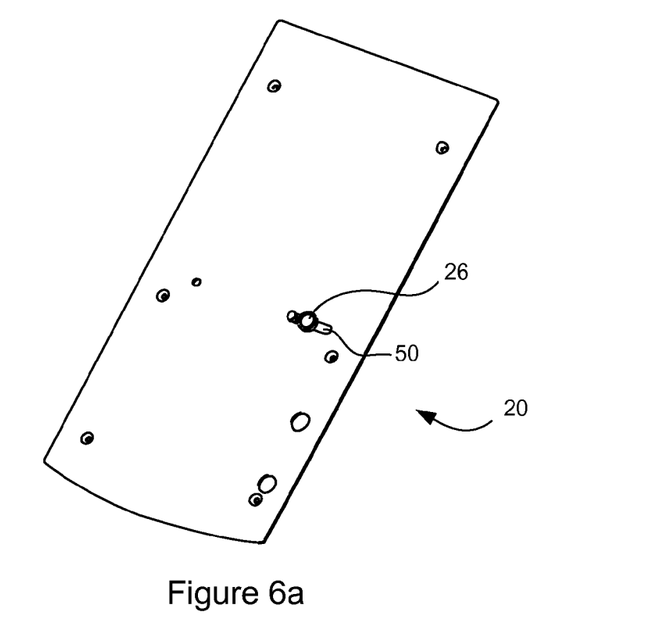
FIG. 6a is a perspective view of a slide plate of the roller assembly.
Figure 6B:
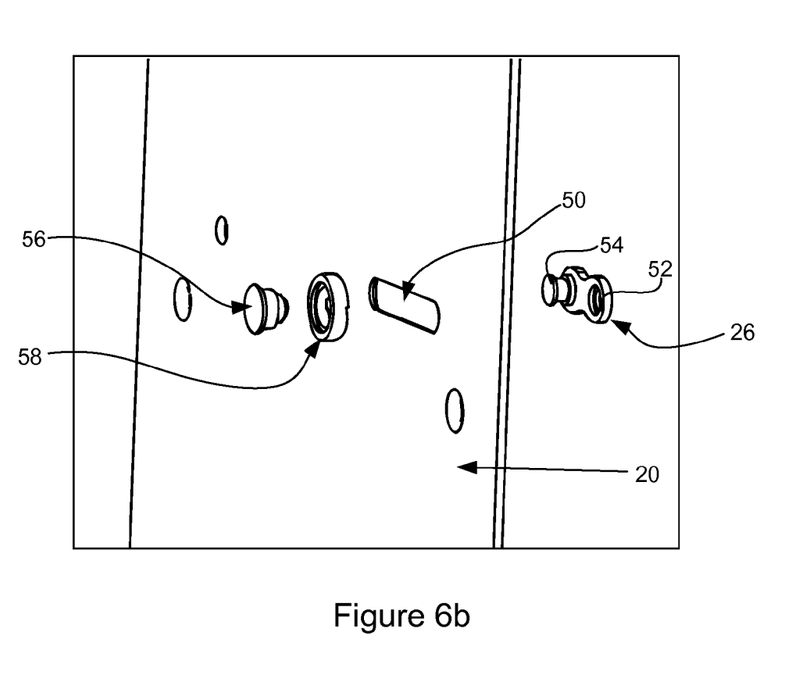
FIG. 6b is an enlarged view of a portion of the slide plate.

Turning to FIG. 6a, a schematic diagram of the slide plate 20 is shown. The slide plate 20, which is mounted to the top portion 12, includes a cutout portion 50 for receiving the shuttle portion 26. As shown in FIG. 6b, the shuttle portion 26 includes a hole portion 52 and a stud portion 54. The shuttle portion 26 is locked in the cutout portion 50 by a wheel pin 56 inserted through the hole portion 52 while a cam follower 58 is placed over the stud portion 54. Although not shown, the wheel pin 56 is inserted through one of the openings 38 to hold the actuator 22 against the slide plate 20. The shuttle portion 26 has an hourglass shape which minimizes the surface area contact between the shuttle portion 26 and the cutout portion 50 to reduce friction, although it is appreciated that the shuttle portion is not limited to the shape disclosed herein, and that alternative shapes which minimize surface area contact may be appropriate. In the preferred embodiment, the shuttle portion 26 and the wheel pin 56 are welded together and ride within the cutout portion 50 in the slide plate 20.

The shuttle portion 26 provides a means for the cam follower 58 and the actuator 22 to be adjacent each other (best shown in FIGS. 7a and 7b) rather than in perpendicular alignment with the slide plate 20, as is typical in conventional slider phone assemblies. This advantage allows other device components to be placed over the shuttle portion 26 as space is limited within the mobile communication device 10.

Figure 7A:
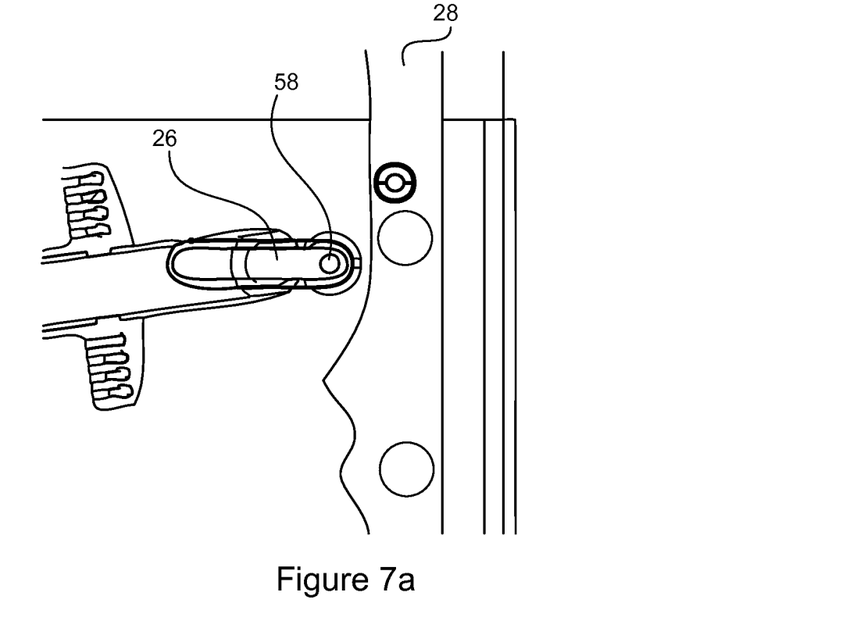
FIGS. 7a and 7b are front views of a shuttle portion and the cam portion.
Figure 7B:
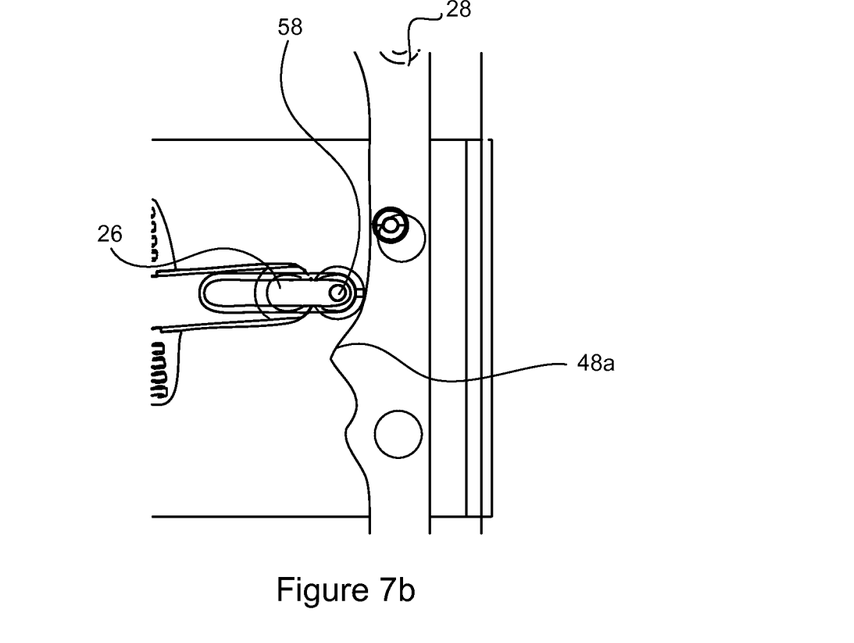

Due to the hourglass shape of the shuttle portion 26, a further advantage is realized. As shown in FIGS. 7a, the cam follower 58 does not touch the cam portion 28 in areas where the cam portion 28 is flat. This reduces the feeling of drag (due to friction) the user can experience with existing slider phones whereby the roller wheel, or cam follower, is consistently riding on its cam. As shown in FIG. 7b, when the slide plate 28 nears the intermediate position defined by the stopping detent 44 (and similarly with the velocity reducing sections 42), the cam follower 58 engages the cam portion 28 in order to locate the sliding plate, where necessary, into the desired position.

Turning to FIGS. 8a to 8c, schematic views of the roller assembly 16 in the closed, intermediate and open positions, respectively, are shown. During movement of the top portion 12 with respect to the bottom portion 14, the guide plate 18 and the cam portion 28 remain stationary while the slide plate 20 slides within the guide rails 32 of the guide plate 18 and the shuttle portion 26, actuated by the actuator 22 and force applied by a user, rides back and forth over selected sections of the cam portion 28.

Assuming that the communication device 10 is in the closed position (FIG. 8a), the guide plate 18 is located near the top of the slide plate 20 with the actuator 22 in a slightly compressed rest position and the cam follower 58 located away from the cam portion 28. If the user decides to move the phone from the closed to the open position, a force is applied to the top portion 12. The force applied to the top portion 12 causes the slide plate 20 to slide upwards within the guide rails 32 and causes the spring 24 in the actuator 22 to compress, thereby moving the shuttle portion 26 towards the cam portion 28. In another embodiment, the spring 24 can also be placed in tension when displaced. As the shuttle portion 26, or cam follower 58, nears the intermediate or stopping detent 44, the cam follower 58 engages the bottom edge of the bottom ridge (as previously referenced in FIG. 5). As the slide plate 20 continues towards the open position, the cam follower 58 contacts the steeper edge of the ridge which stops the movement of the cam follower and causes the sliding plate 20 to stop sliding. At this point, the top portion 12 is in the intermediate position such as shown in FIG. 8b. As can be seen, the shuttle portion 26 is resting in the detent 44. The user can then access any functionality that is associated with this position (i.e., camera or media player functionality, for example).

If the user wishes to move the device 10 to the open position, the user can apply a further force to the top portion 12 thereby urging the cam follower 58 to overcome the steeper edge and pass over the ridge allowing the slide plate 20 to continue sliding within the guide rails 32 towards the upper edge of the cam portion. As the slide plate 20 reaches the open position, the extension of the spring 24 allows the cam follower 58 to contact the cam portion 28 at the velocity reducing section to slow down the movement of the sliding plate 20 so that there is a less abrupt impact experienced by the user when the open position is reached. Similarly, the velocity reducing section at the bottom end of the cam portion 28 provides the same dampening stop when the top portion is urged to the closed position.

When the top portion 12 has reached the open position, the user can then access the functionality associated with the device in this position (i.e., telephone, email and/or browser applications, for example). When in the open position, the spring 24 in the actuator 22 is once against extended, thereby causing the shuttle portion 26 to be withdrawn within the cutout portion 50

As described above, when closing the phone, the user can close it in a single motion, as the top edges of the ridges have the gentler slope when compared to bottom edges, whereby less force is required to overcome the intermediate or stopping detent 44. Thereby the intermediate position can be bypassed when closing the phone. By providing this advantage, a user can close the phone without having to perform a two-step process.

Figure 9:
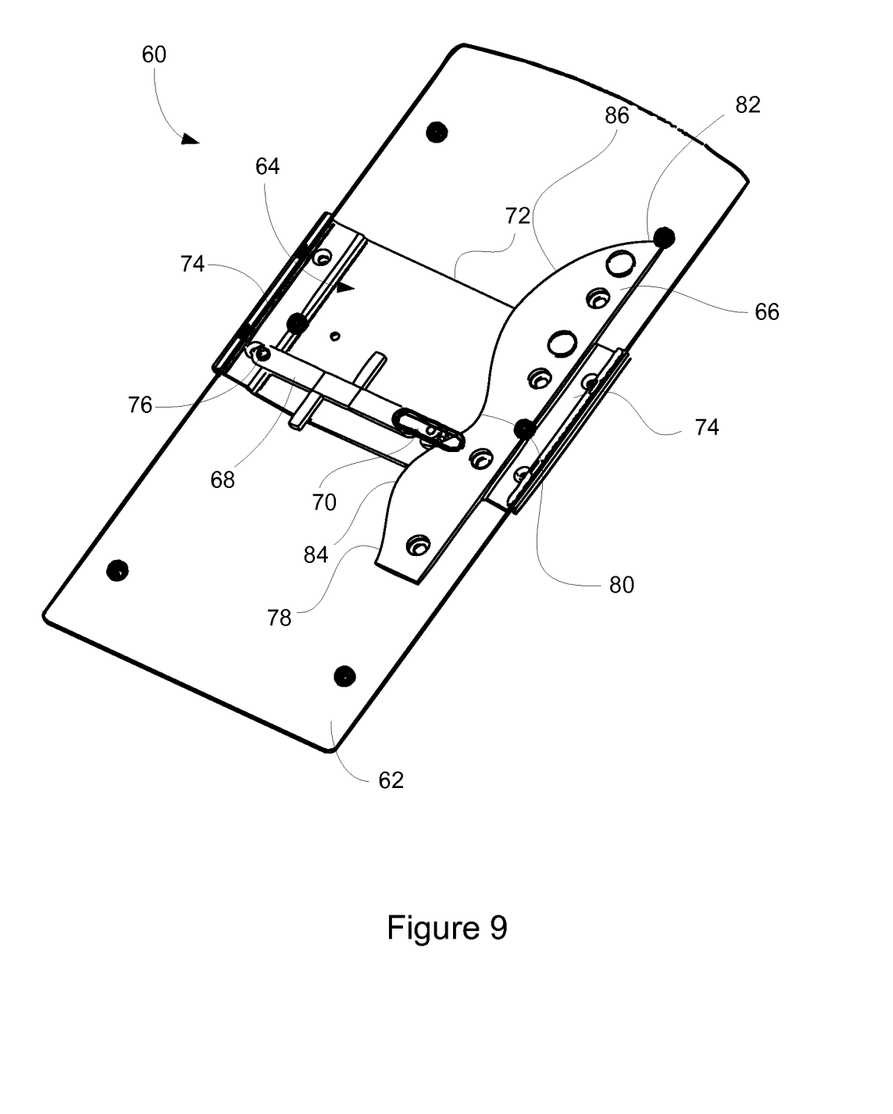
FIG. 9 is a perspective view of another embodiment of a roller assembly for use with the mobile communication device.

Turning to FIG. 9, a second embodiment of a roller assembly 60 for a mobile communication device is shown. In this embodiment, the design of the roller assembly provides a mechanical roller assembly which mimics the feel of a magnetically driven or implemented slide mechanism.

The roller assembly 60 includes a slide plate 62, a guide plate 64, a cam portion 66, a spring actuator 68 and a shuttle portion 70. The slide plate 62 is shown in an outline format so the rest of the roller assembly 60 can be seen in this figure. The slide plate 62 is preferably a solid portion like the slide plate of FIG. 2 and is attached, or mounted to the top portion 12 of the device.

The guide plate 64 includes a base portion 72 and a pair of guide rails 74 and is mounted to the bottom portion 14 of the device. The cam portion 66 is mounted to the guide plate 64 via a set of fasteners or the like as will be understood by one skilled in the art. Alternatively, the cam portion 66 can be mounted to the bottom portion 14. The spring actuator 68 is connected to one end of the shuttle portion 70 and is mounted to the slide plate 62 via a fastener 76. The other end (or cam follower 77) of the shuttle portion 70 is in contact with the cam portion 66 to traverse or ride up and down the cam portion 66 when the slide plate 62 is moved between the open, intermediate and closed positions. In the preferred embodiment, implementation of the shuttle portion 70 is identical to the implementation of the shuttle portion 26.

Figure 10:
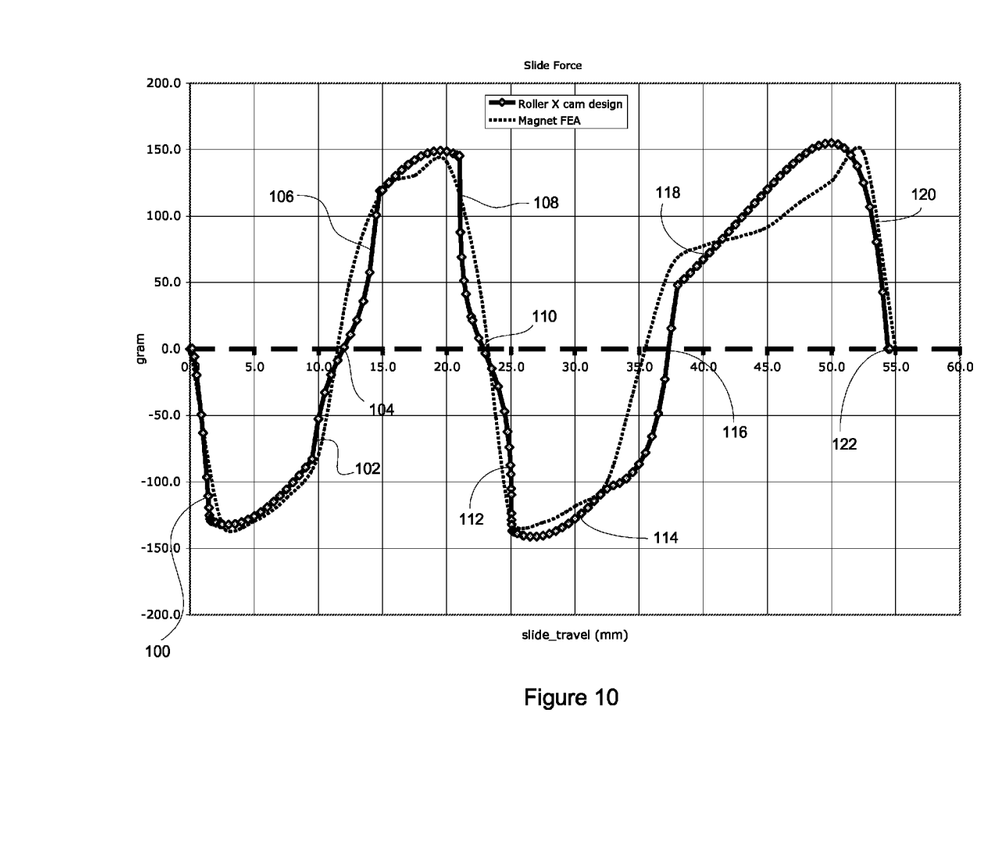
FIG. 10 is a graph illustrating slide force vs slide travel for a magnetic slide assembly and a mechanical roller assembly.

The profile of the cam portion 66 is designed to follow the force profile of a magnetically designed roller assembly and includes a set of, preferably three (3), valley portions 78, 80 and 82. The intermediate valley portion 80 can be seen as an intermediate, or stopping detent portion. When the shuttle portion 70 is in contact with the cam portion 66 in these three valley portions 78, 80 and 82, the device will either be in the closed, intermediate or open positions, respectively. Between the valley portions are hill portions, seen as a pair of hill portions, or ridges, 84 and 86. The slope and size of the valley and hill portions can be varied as per customer requirements but the overall profile of the cam portion 66 can not be changed whereby the cam portion 66 preferably includes a set of three valley portions separated by a pair of hill portions in order to provide the required force profile. An example of the force profile experienced in the slide direction is shown in FIG. 10 which also provides a comparison between the slide force experienced in a magnetic roller assembly in the slide direction (seen as the dotted line) and the slide force experienced using the mechanical roller assembly in the slide direction (seen as the line with squares) described above with respect to FIG. 9. The slide direction is the direction in which the top portion 12 and the bottom portion 14 move with respect to each other between the open, intermediate and closed positions when a force is applied by a user.

The spring actuator 68 includes a compression spring 88 (as shown in FIGS. 11a to 11e) which compresses and extends in response to the contact between the shuttle portion 70 and the cam portion 66.

Figure 11A:
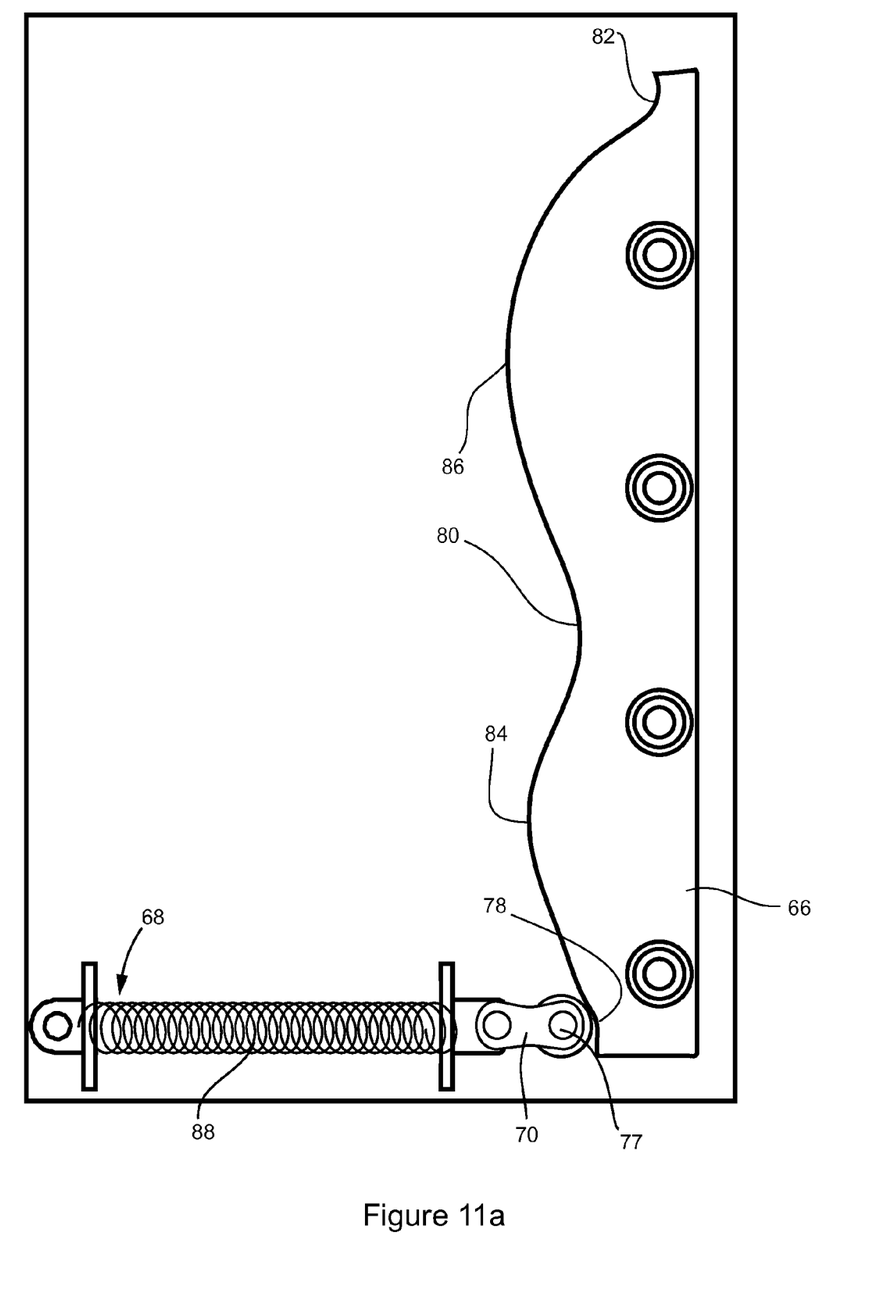
FIGS. 11a to 11e are front views of the roller assembly of FIG. 9 in various positions.

In operation, assuming that the device is initially in the closed position (as shown in FIG. 11a), the shuttle portion 70 is in contact with the valley portion 78 and the spring 88 is close to being at rest. When the user decides to slide the top portion 12 thereby moving the phone out of the closed position to the intermediate position, the user applies a force to the top portion (and indirectly to the slide plate 62) to move the shuttle portion 70 towards the valley intermediate portion 80.

Figure 11B:
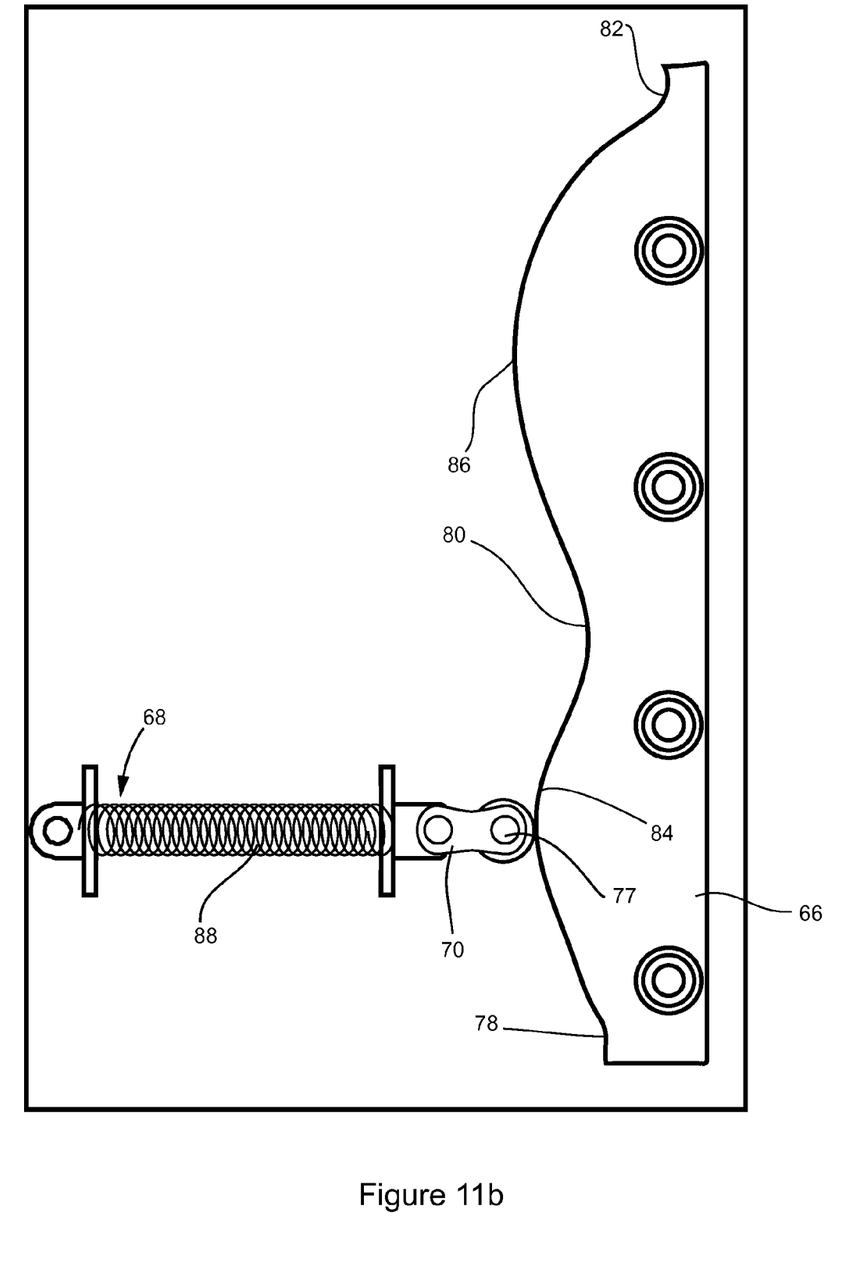
Figure 11C:
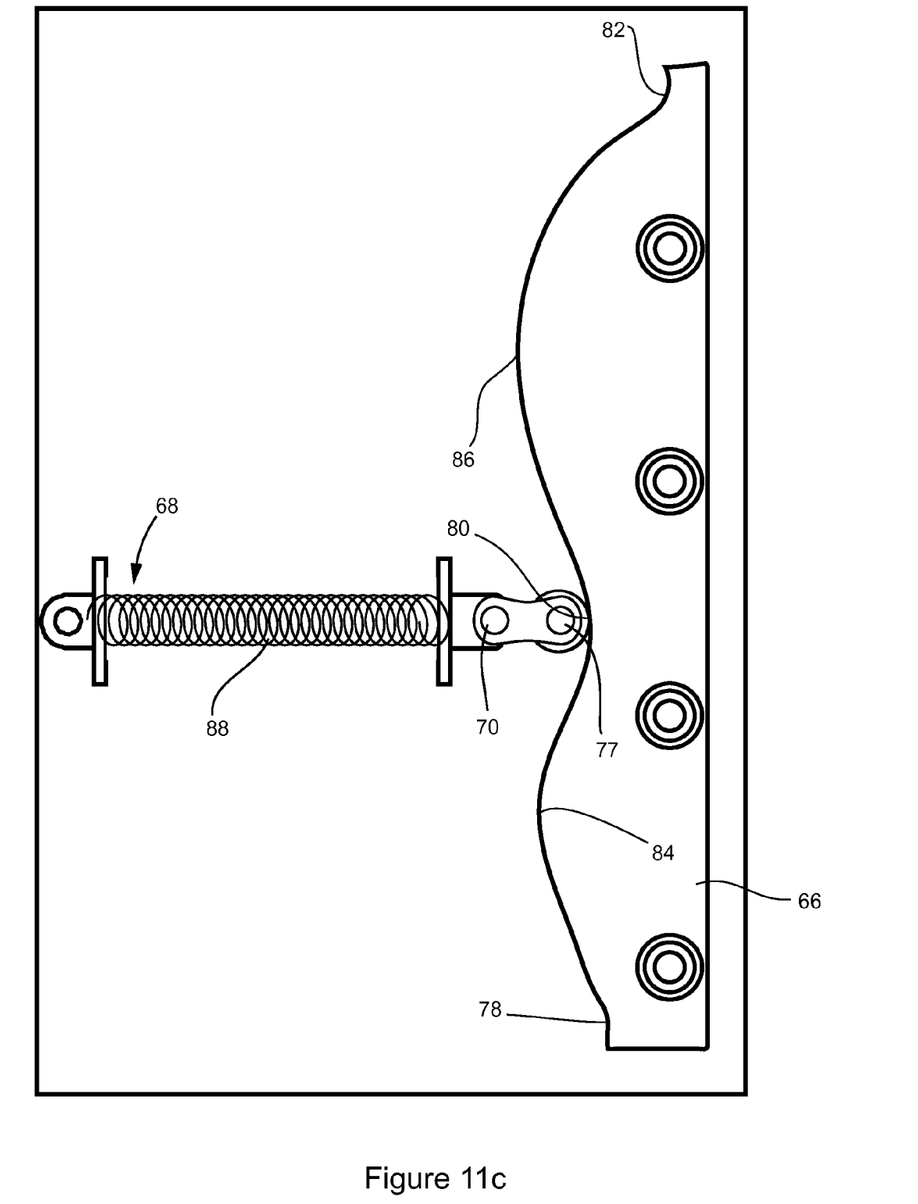
Figure 11D:
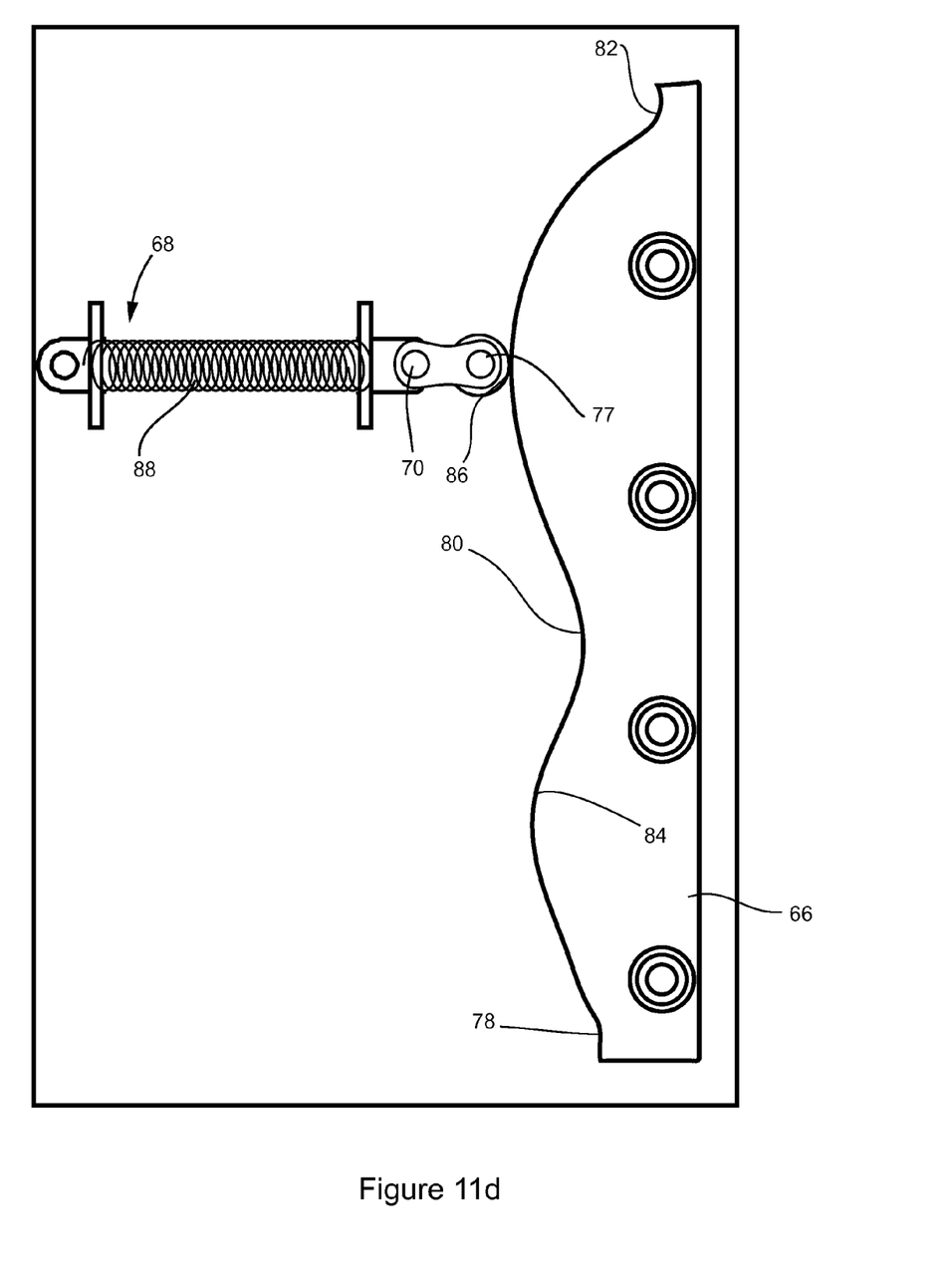
Figure 11E:
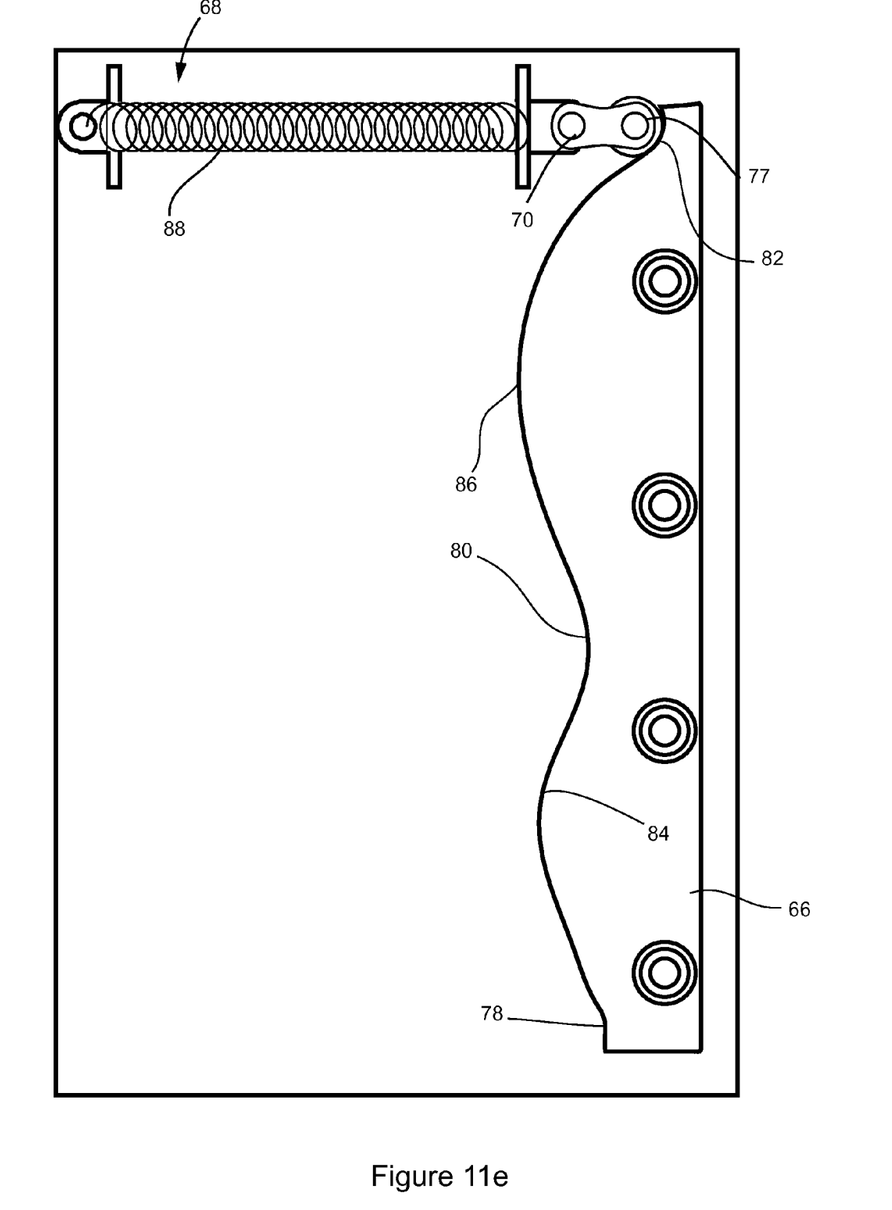

As the shuttle portion 70 traverses up the hill portion 84 towards the valley portion 80, there is an initial force being applied against the user's thumb (seen as the negative force 100 in FIG. 10) which lessens as shuttle portion 70 approaches the top of the hill portion 84 (seen as the negative force 102 in FIG. 10). Once the shuttle portion 70 reaches the top of the hill portion 84 (as shown in FIG. 11b), there is no force being applied against the top portion of the device (seen as the zero crossing, or buckling point, 104 in FIG. 10). While there will be a force experienced by the slide plate 62 from the spring 88, as this force is perpendicular to the slide direction, there is no force experienced in the slide direction.

As the shuttle portion 70 continues towards the intermediate position, or valley portion 80, there is a positive slide force as the shuttle portion 70 is going down the hill portion 84 (seen as positive force 106 in FIG. 10) which diminishes and lessens as the shuttle portion 70 approaches the bottom of the valley portion 80 (seen as positive force 108 in FIG. 10). When shuttle portion 70 reaches the bottom of the valley portion 80, the phone is in the intermediate position (shown as FIG. 11c) and no slide force is being experienced (seen as zero crossing 110 in FIG. 10). As can be seen, from FIG. 10, the force profile experienced by the user from the closed position to the intermediate position is similar to the force profile which would be experienced by a user using a magnetically implemented roller assembly. However, use of the mechanically implemented roller assembly provides advantages over a magnetically implemented solution, such as, but not limited to, not affecting a device's magnetic field or not creating electromagnetic interference.

Similarly, when the user decides to move from the intermediate position (represented by valley portion 80) to the open position (represented by valley portion 82), the shuttle portion 70 is urged up the hill portion 86. As the shuttle portion 70 traverses the profile of the cam portion 66, the spring actuator 68 compresses against the slide plate 62 of the device as the device moves from the intermediate position to the closed position. During this traversal, a negative slide force is experienced (seen as negative slide force portion 112 of FIG. 10). As the shuttle portion 70 continues to travel towards the peak of the hill portion 86, the negative slide forces lessen (seen as negative force portion 114 of FIG. 10) until the shuttle portion 70 reaches the peak of hill portion 86 (FIG. 11d) whereby the resultant forces are zero in the slide direction (seen as zero crossing 116 of FIG. 10). After reaching the peak of hill portion 86, the continued force applied on the slide plate 62 causes the shuttle portion 70 to traverse down the hill portion 86 towards the valley portion 82, or open position. As the shuttle portion 70 travels down the hill portion 86, there is a positive force applied to the slide plate 62 (seen as positive force portion 118 of FIG. 10) which lessens as the shuttle portion 70 approaches the valley portion 82 (seen as positive force portion 120 of FIG. 10) before coming to rest in the valley portion 82, or closed position (shown in FIG. 11e) in which no further slide forces are being experienced (seen as zero crossing 122 of FIG. 10).

As can be seen from FIG. 10 and the description above with respect to operation of the roller assembly 60, there is a correlation between the force profile experienced by the user using the roller assembly 60 compared to the force profile which would be experienced by a user using a magnetically implemented roller assembly. Therefore an advantage of the roller assembly 60 is the provision of a less intrusive solution than the implementation of a magnetic roller assembly.

Although described with respect to a mobile communication device, the roller assembly can also be implemented with a handheld electronic device or within any device which requires a slide mechanism.

In the preceding description, for purposes of explanation, numerous details are set forth in order to provide a thorough understanding of the embodiments. However, it will be apparent to one skilled in the art that these specific details are not required in order to practice the disclosure. The above-described embodiments are intended to be examples only. Alterations, modifications and variations can be effected to the particular embodiments by those of skill in the art without departing from the scope of the disclosure, which is defined solely by the claims appended hereto.

What is claimed is:

1. A roller assembly for a mobile communication device having a top portion and a bottom portion, the top and bottom portions slidably connected by the roller assembly, the roller assembly comprising:
a slide plate;
a shuttle portion located within the slide plate; and
a cam portion for engaging with the shuttle portion, the cam portion including an intermediate detent portion and a velocity reduction section at each end to reduce an impact a user experiences when urging the slide portion to the open or closed positions;
whereby when the slide plate is moved between open and closed positions, the slide plate can be stopped in an intermediate position by the intermediate detent portion;
wherein in the intermediate position, the user can access some functionality which is not available in the closed position.

2. The roller assembly of claim 1 wherein the slide plate is stopped in the intermediate position via the contact between the shuttle portion and the intermediate detent portion.

3. The roller assembly of claim 1 wherein the intermediate detent portion is a pair of ridges located on the cam portion.

4. The roller assembly of claim 3 wherein one of the ridges includes a steeper profile than the other of the ridges to restrict the slide plate from travelling directly from the closed position to the open position.

5. The roller assembly of claim 3 wherein both of the ridges have gentle profiles thereby allowing the slide plate to travel directly from the open position to the closed position.

6. The roller assembly of claim 1 further comprising:
a guide plate including guide rails for receiving and guiding the slide plate; and
an actuator connected to the slide plate.

7. The roller assembly of claim 6 wherein the actuator is connected to the guide plate.

8. The roller assembly of claim 7 wherein the actuator comprises:
a pair of end pieces; and
a set of springs connected to the pair of end pieces;
wherein one end piece is mounted to the slide plate and the other end piece is mounted to the guide plate.

9. The roller assembly of claim 6 wherein the cam portion comprises:
a set of valley portions representing open, intermediate and closed positions, and
a set of hill portions, the hill portions situated between the set of valley portions.

10. The roller assembly of claim 9 wherein there are three valley portions and a pair of hill portions.

11. The roller assembly of claim 9 wherein the actuator comprises a spring and is connected to the shuttle portion.

12. The roller assembly of claim 11 wherein movement of the slide plate causes the shuttle portion to traverse a profile of the cam portion.

13. The roller assembly of claim 12 wherein when the shuttle portion is traversing up one of the hill portions, a negative slide force is experienced.

14. The roller assembly of claim 12 wherein when the shuttle portion is traversing down one of the hill portions, a positive slide force is experienced.

15. The roller assembly of claim 12 wherein when the shuttle portion is at a peak of one of the hill portions or a lowest point in one of the valley portions, no slide force is experienced.

16. A roller assembly for a mobile communication device having a top portion and a bottom portion, the top and bottom portions slidably connected by the roller assembly, the roller assembly comprising:
a slide plate mounted to the top portion;
a shuttle portion located within the slide plate; and a cam portion for engaging with the shuttle portion in open, intermediate and closed positions the cam portion including a velocity reduction section at each end to reduce an impact a user experiences when urging the slide portion to the open or closed positions;

wherein in the intermediate position, the user can access some functionality which is not available in the closed position;

wherein a slide force experienced by the slide plate in a slide direction between the open, intermediate and closed positions parallels a magnetic slide assembly slide force profile.

17. The roller assembly of claim 16 wherein the cam portion comprises:

a set of valley portions representing the open, intermediate and closed positions, and a set of hill portions, the hill portions situated between the set of valley portions.

18. The roller assembly of claim 16 further comprising:

a guide plate including guide rails for receiving and guiding the slide plate; and an actuator connected to the slide plate.

19. The roller assembly of claim 16 wherein there are three valley portions and a pair of hill portions.

* * * * *